(12) United States Patent
Pfeil et al.

(10) Patent No.: US 9,157,592 B2
(45) Date of Patent: Oct. 13, 2015

(54) LIGHTING DEVICE

(71) Applicant: Audi AG, Ingolstadt (DE)

(72) Inventors: Marcus Pfeil, Feucht (DE); Jürgen Maurer, Ingolstadt (DE); Richard Mohos, Ingolstadt (DE); Johannes Tovar, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 158 days.

(21) Appl. No.: 13/833,187

(22) Filed: Mar. 15, 2013

(65) Prior Publication Data
US 2013/0242588 A1 Sep. 19, 2013

(30) Foreign Application Priority Data

Mar. 16, 2012 (DE) .................... 10 2012 005 399

(51) Int. Cl.
F21V 9/00 (2015.01)
F21S 8/10 (2006.01)
(Continued)

(52) U.S. Cl.
CPC ................. *F21S 48/00* (2013.01); *B60Q 3/004* (2013.01); *B60Q 3/0289* (2013.01); *G02B 6/0001* (2013.01); *G02B 6/001* (2013.01); *G02B 6/0011* (2013.01)

(58) Field of Classification Search
CPC .......... G02B 5/00; G02B 6/0002; G02B 6/10; G02B 6/24; G02B 6/2817; G02B 6/0031; G02B 7/00; G02B 7/003; G02F 1/133615; G02F 1/133553; F21Y 111/00; F21V 5/00; F21V 7/0025; F21V 13/10

USPC ......... 362/298, 299, 326, 327, 228, 329, 540, 362/543, 545, 546, 551, 554, 555, 610, 615, 362/616, 623, 624, 511; 385/15, 31, 34, 385/49–52, 130, 116–121, 902, 78, 100, 385/102, 114, 146, 901
See application file for complete search history.

(56) References Cited

U.S. PATENT DOCUMENTS 5,690,408 A * 11/1997 de la Pena et al. ............ 362/556
5,709,453 A * 1/1998 Krent et al. ................... 362/496
(Continued)

FOREIGN PATENT DOCUMENTS

CN 102252262 11/2011
DE 297 17 698 1/1998
(Continued)

OTHER PUBLICATIONS

Chinese Search Report issued in counterpart Chinese Patent Application No. 201310081116.8 on Jun. 25, 2015.
(Continued)

*Primary Examiner* — Hargobind S Sawhney
(74) *Attorney, Agent, or Firm* — Henry M. Feiereisen LLC

(57) ABSTRACT

A lighting device includes a housing having first and second housing parts to define a receiving space. The housing parts are inwardly recessed and converge into marginal regions, respectively. Arranged in the receiving space is a light conductor. A plastic film strip is arranged between edges of the housing parts and is transparent for light emitted by the light conductor, with the emitted light being projected into one end face of the film strip and extracted from another end face of the film strip. The film strip is sized to terminate flush with the housing parts.

18 Claims, 1 Drawing Sheet

(51) Int. Cl.
  *B60Q 3/00* (2006.01)
  *B60Q 3/02* (2006.01)
  *F21V 8/00* (2006.01)

(56) References Cited

U.S. PATENT DOCUMENTS

| | | |
|---|---|---|
| 6,735,893 B2 * | 5/2004 | Wolf ............................ 40/591 |
| 7,460,754 B2 * | 12/2008 | Lee et al. ...................... 385/115 |
| 8,827,572 B2 * | 9/2014 | Zhou ............................ 385/88 |
| 2005/0213342 A1 | 9/2005 | Tufte |
| 2013/0016525 A1 | 1/2013 | Metzech et al. |
| 2013/0148373 A1 * | 6/2013 | Bayersdorfer et al. ....... 362/511 |

FOREIGN PATENT DOCUMENTS

| | | |
|---|---|---|
| DE | 199 21 968 | 11/2000 |
| DE | 100 32 927 | 1/2002 |
| DE | 101 35 478 | 4/2003 |
| DE | 102 36 499 | 2/2004 |
| DE | 102005010256 | 9/2006 |
| DE | 102010006915 | 9/2011 |
| DE | 102010030660 | 12/2011 |
| EP | 1 055 866 | 11/2000 |

OTHER PUBLICATIONS

English translation of Chinese Search Report issued in counterpart Chinese Patent Application No. 201310081116.8 on Jun. 25, 2015.

* cited by examiner

LIGHTING DEVICE

CROSS-REFERENCES TO RELATED APPLICATIONS

This application claims the priority of German Patent Application, Serial No. 10 2012 005 399.1, filed Mar. 16, 2012, pursuant to 35 U.S.C. 119(a)-(d), the content of which is incorporated herein by reference in its entirety as if fully set forth herein.

BACKGROUND OF THE INVENTION

The present invention relates, in general, to a lighting device, and more particularly to a contour lighting for a motor vehicle.

The following discussion of related art is provided to assist the reader in understanding the advantages of the invention, and is not to be construed as an admission that this related art is prior art to this invention.

Lighting devices come in various types and shapes to illuminate a space or to identify or highlight certain articles or objects. These lighting devices are oftentimes referred to as contour lightings as they accent the shape and contour of an object being highlighted. Contour lightings find applications in equipments or machines and also in motor vehicles. In particular, when used in motor vehicles, contour lightings find applications for speakers, buttons, control panels, cup holders etc. These types of lighting devices are in fact lighting strips which highlight certain contours. Such contour lightings are typically line lights that are realized by a light conductor which tracks the contour being highlighted. The light conductor is directly visible or installed behind a diffuser disk. Light is projected into one end face of the light conductor and exits to the side along the light conductor so that a linear light strip becomes visible.

To avoid an adverse impact on the properties of such a light-conducting element, such as a light conductor, such an element requires a cross sectional area of at least about 7 $mm^2$, whereby a height/width or diameter should not be less than 2.5 mm. Parameters that limit the use of diffuser disks include production and integration in the available installation space. For that reason, conventional contour lightings have a significant width, i.e. the bright light strip is fairly broad, i.e. typically about 2.5 mm or more. Such a broad light strip is however in some cases undesired for optical reasons as the object to be highlighted is fairly small so that such a broad light strip would virtually be overdimensioned, or for structural reasons because it may not be possible to install such a broad light strip.

It would therefore be desirable and advantageous to provide an improved lighting device to obviate prior art shortcomings.

SUMMARY OF THE INVENTION

According to one aspect of the present invention, a lighting device includes a housing having first and second housing parts to define a receiving space, the housing parts being inwardly recessed to converge into marginal regions, respectively, a light conductor arranged in the receiving space, and a plastic film strip arranged between edges of the housing parts and being transparent for light emitted by the light conductor, with the emitted light being projected into one end face of the film strip and extracted from another end face of the film strip, the film strip being sized to terminate flush with the housing parts.

The present invention resolves prior art problems by providing a two-part housing which in order to generate a line light is elongated and of such a shape to correspond to the contour to be emulated and the contour to be framed by the generated light line. The receiving space of the housing accommodates the light conductor, with light being projected into the light conductor on one end and being extracted to the side. Disposed in parallel relationship to the light conductor is the plastic film strip which is held between the edges of the housing parts and terminates flush with the housing parts. The plastic film strip is transparent for light being emitted from the light conductor. As the film strip extends parallel to the light conductor, emitted light from the light conductor is thus projected into a narrow end face of the film strip. Light exits from the other narrow end face which is flush-mounted between the narrow marginal regions of the housing parts. This narrow end face thus forms the sole light emitting zone that defines the light strip. The thickness of the film strip can be made significantly smaller than the diameter of the light conductor so that realization of a much narrower light strip is possible. As a result, the contour lighting can be made very subtle to highlight even smaller structures in a pleasing look and can be easily integrated even when the available installation space is tight.

According to another advantageous feature of the present invention, the film strip may have a thickness of less than 1 mm. Currently preferred is a thickness of the film strip between 0.3-0.5 mm. The use of such a thin film strip results in light strips that have a very small width of substantially below 1 mm, when compared to conventional contour lightings that have a light strip width of 2 mm or more.

According to another advantageous feature of the present invention, the film strip may be made of polymethyl methacrylate (PMMA). Such a film strip is sufficiently transparent.

According to another advantageous feature of the present invention, the film strip may be dyed. In this way, there is the option to emit a colored contour lighting. Thus, generation of a red, yellow or green contour lighting line becomes possible even though white light is projected into the light conductor as initial light.

According to another advantageous feature of the present invention, each of the marginal regions of the first and second housing parts defines a support surface, with the film strip being received between the support surfaces of the marginal regions. In this way, the film strip can be securely fixed and integrated in the housing. The support surfaces provide a sufficiently large area for establishing a secure and firm fixation of the film strip. Advantageously, the support surfaces adjoin the receiving space in which the light conductor is received. As a result, the film strip can be placed in immediate proximity to the light conductor.

According to another advantageous feature of the present invention, the film strip can be clamped or bonded between the edges of the housing parts. Advantageously, the film strip is clamped or bonded between the support surfaces. This secures the film strip between the edges. Clamping of the film strip may be realized by using suitable connections, such as snap or clamping mechanisms.

According to another advantageous feature of the present invention, the receiving space may have a round cross section and be formed by a half-round depression in one of the first and second housing parts and a half-round depression in the other one of the first and second housing parts, when the housing is assembled by placing the first and second housing parts upon one another.

According to another advantageous feature of the present invention, the receiving space may have at least one area which can be painted or coated through vapor-depositing, advantageously with aluminum, to form a mirror surface.

The marginal region of the housing where the strip with its light exit end face is arranged can be configured in a narrowest possible way by making the marginal region as small as possible through inwardly recessing one or both housing parts. In this way, the marginal region of the housing can be designed extremely narrow, especially when both housing parts are inwardly recessed. As a result, the marginal region has an overall thickness in the range of few millimeters so that the housing remains inconspicuous even when integrated in the object whose contour should be highlighted. Advantageously, the housing is defined by a length in an area where the housing parts are inwardly recessed, with the length being at least three times, advantageously four times, a size of a width of this area. As a result, the housing is overall formed with a narrow elongate marginal region which can be integrated to suit the contour.

According to another advantageous feature of the present invention, the housing has an end face on both sides of the end face of the film strip, with the end face of the housing being coated, e.g. metallized or painted, and/or structured. The end face of the housing edge, i.e. the location where the film strip terminates flush with the housing, is normally also visible when installed. By coating, painting and/or providing structure, e.g. grain pattern or the like, this region can be provided with a particular look which is visible even when the contour lighting is inactive. For example, a circumferential metallic look can be realized which is visible and in which the light strip may optionally be produced.

According to another aspect of the present invention, a motor vehicle includes a lighting device which has a housing having first and second housing parts to define a receiving space, the housing parts being inwardly recessed to converge into marginal regions, respectively, a light conductor arranged in the receiving space, and a plastic film strip arranged between edges of the housing parts and being transparent for light emitted by the light conductor, with the emitted light being projected into one end face of the film strip and extracted from another end face of the film strip, the film strip being sized to terminate flush with the housing parts. Such a lighting device may be used to provide a frame that follows a contour of loudspeakers, buttons, control panels, display zones, handles, arm rests etc. Of course, the cross sectional geometry of the housing can be best suited to the application at hand. The housing is hereby shaped such that its substantial housing body can be integrated at a location where the contour lighting is to be installed. Suitable holding or fastening members are, of course, provided on the housing to enable proper installation.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
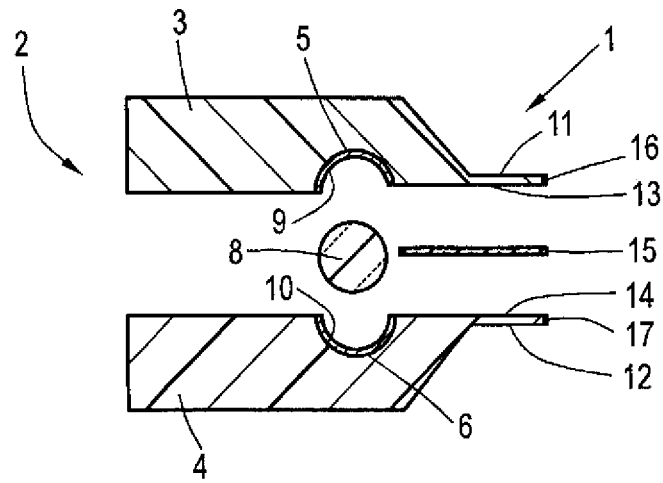
FIG. 1 is a schematic, exploded sectional view of one embodiment of a lighting device according to the present invention.

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown a schematic, exploded sectional view of one embodiment of a lighting device according to the present invention, generally designated by reference numeral 1 and useful as contour lighting for a motor vehicle. The lighting device 1 includes a housing 2, comprised of a first housing part 3 and a second housing part 4. The housing parts 3, 4 advantageously involve plastic components which can be made through injection molding. FIG. 1 shows merely a basic concept of the lighting device 1 and it will be understood that the housing 2 has a cross sectional shape that can have any suitable configuration. Thus, there is no need for the housing to have a rectangular shape at least not in the region on the left-hand side of the drawing. Of course, any kind of geometry and configuration is conceivable. Suitable holding and fastening members may hereby be formed on the housing in any suitable manner.

Figure 2:
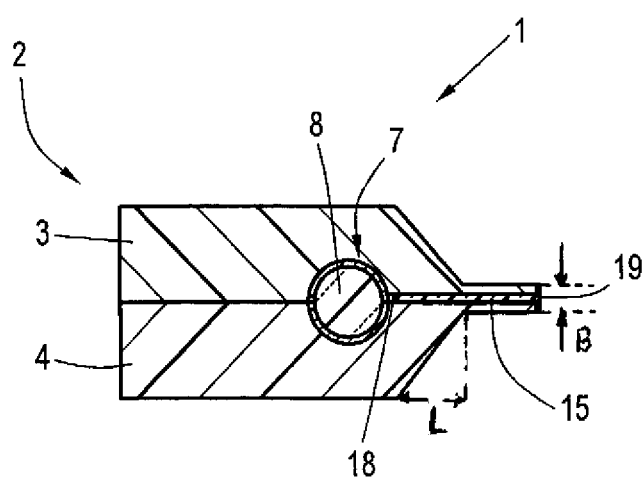
FIG. 2 is a sectional view of the lighting device of FIG. 1 in assembled state.

The housing parts 2, 3 have half-round depressions 5, 6, respectively, which when the housing 2 is assembled, as shown in FIG. 2, bounds a receiving space 7 for receiving a light conductor 8. The light conductor 8 may have a diameter of 5 mm and has also a round cross section so as to establish a shape-complementing geometry.

The half-round depressions 5, 6 have each a coating 9, 10, for example a mirror coating.

The housing parts 3, 4 are inwardly recessed towards their marginal regions 11, 12 so that the marginal regions 11, 12 are very narrow to effectively extend in a linear way. Overall, the entire housing 2 is an elongate component of a shape which corresponds to a contour to be illuminated.

Furthermore, the housing parts 3, 4 have terminal support surfaces 13, 14 to retain there between a strip 15 which is made of a plastic film, e.g. a PMMA (polymethyl methacrylate) film. As shown in FIG. 2, the strip 15 is secured between the support surfaces 13, 14, for example clamped or bonded.

In the illustrated non-limiting example, the end faces of the marginal regions 11, 12 are provided with a coating 16, 17, for example, a metal coating of aluminum or the like , so as to provide a metallic look at the edge.

In the assembled lighting device 1, as shown in FIG. 2, the housing parts 3, 4 are connected with one another by for example not shown locking members or the like. The light conductor 8 is received in the receiving space 7. The strip 15 is sized to extend up to the receiving space 7 and thus to the light conductor 8 such that the edge 18 at the end of the film strip 15 is in immediate proximity of the light conductor 8. The edge 19 at the opposite end of the film strip 15 is sized to terminate flush with the end faces of the marginal regions 11, 12. The strip 15 is thin; it may have a thickness between 0.3-0.5 mm.

When projected into one end face of the light conductor 8, light runs through the light conductor 8 and is extracted to the side. The extracted light is projected into the end face 18 of the strip 15, runs through the strip 15 which is transparent for light, and is extracted at the other end face 19 into the space. Thus, a very narrow, i.e. light strip of 0.3-0.5 mm width is visible at the end face 19, combined with the provided metallic look of the coatings 16, 17.

The thickness of the configuration of both strip-shaped marginal regions 11, 12 and the film strip 15 is also very narrow and should advantageously be in the range of few millimeters. This can easily be realized because the film strip 15 is thin and because the housing parts 3, 4 are inwardly recessed so that the marginal regions 11, 12 can also be made very narrow.

Figure 3:
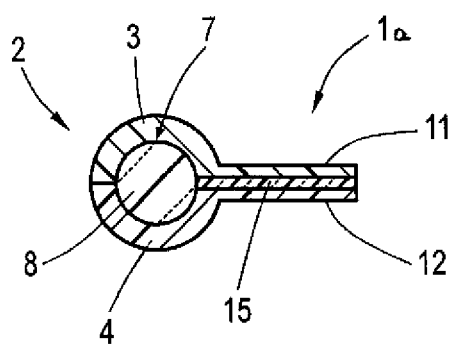
FIG. 3 is a schematic sectional view of another embodiment of a lighting device according to the present invention.

FIG. 3 shows by way of example another embodiment of a lighting device according to the present invention, generally designated by reference numeral 1a. Parts corresponding with those in FIG. 1 are denoted by identical reference numerals and not explained again. The description below will center on the differences between the embodiments. In this embodiment, the housing 2 is also made of two housing parts 3, 4 which have however a generally round cross section. The housing parts 3, 4 define the receiving space 7 for receiving the light conductor 8. Plastic film strip 15 is held between the support surfaces of the marginal regions 11, 12 and is made of a material, advantageously PMMA, which is transparent for light emitted by the light conductor 8. The marginal regions 11, 12 are dimensioned such as to establish a ratio of overall width B, i.e. both marginal regions 11, 12 including thickness of film strip 15, to length L of the marginal regions 11, 12 of 1:4 or 1:3.

Although not shown in detail, the periphery of the receiving space 7 may also be provided with a mirror surface or painted. Likewise, the end faces of the marginal regions 11, 12 may be provided with a respective coating or structure.

The film strip 15 is made of a plastic which is transparent for emitted light, like e.g. PMMA. When a light source is used which emits white light, it is advantageous to dye the plastic film strip 15 in order to produce a colored light strip.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

1. A lighting device, comprising:
   a housing having first and second housing parts to define a receiving space,
   a light conductor arranged in the receiving space and emitting light; and
   an elongated plastic film strip which is transparent for the light emitted by the light conductor,
   wherein the first and second housing parts are both inwardly recessed toward the elongated film strip and converging into linear marginal regions,
   wherein the elongated film strip is arranged between edges of the housing parts and between the linear marginal regions of the housing parts and terminates flush with the linear marginal regions,
   wherein the elongated film strip has two opposite ends spaced from one another in a direction of elongation of the film strip and having end faces extending transversely to the direction of elongation, and
   wherein the light conductor is arranged at a side of one of the transversely extending end faces of the film strip so that the light emitted by the light conductor is projected into the one transversely extending end face of the film strip and is extracted from another of the transversely extending end faces of the film strip.

2. The lighting device of claim 1, configured in form of a contour lighting for a motor vehicle.

3. The lighting device of claim 1, wherein the film strip has a thickness of less than 1 mm.

4. The lighting device of claim 1, wherein the film has a thickness between 0.3-0.5 mm.

5. The lighting device of claim 1, wherein the strip is made of polymethyl methacrylate (PMMA).

6. The lighting device of claim 1, wherein the film strip is dyed.

7. The lighting device of claim 1, wherein the marginal regions of the first and second housing parts define each a support surface, said film strip being received between the support surfaces of the marginal regions.

8. The lighting device of claim 1, wherein the receiving space adjoins the support surfaces.

9. The lighting device of claim 1, wherein the film strip is clamped and bonded between the edges of the housing parts.

10. The lighting device of claim 1, wherein the film strip is clamped or bonded between the support surfaces.

11. The lighting device of claim 1, wherein the receiving space has a round cross section and is formed by a half-round depression in one of the first and second housing parts and a half-round depression in the other one of the first and second housing parts, wherein the first and second housing parts are placed upon one another, and wherein the light conductor has a round cross section to establish a shape congruent geometry between the receiving space of the housing and the light conductor.

12. The lighting device of claim 1, wherein the receiving space has at least one region which is painted or coated through vapor-depositing to form a mirror surface.

13. The lighting device of claim 12, wherein the at least one region of the receiving space is aluminized.

14. The lighting device of claim 1, wherein the housing is defined by a length in an area wherein the housing parts are inwardly recessed, said length being at least three times a size of a width of said area.

15. The lighting device of claim 1, wherein the housing is defined by a length in an area where the housing parts are inwardly recessed, said length being at least four times a size of a width of said area.

16. The lighting device of claim 1, wherein the housing has an end face which on both sides of the end face of the film strip is coated or structured.

17. The lighting device of claim 16, wherein the end face of the housing is metallized or painted.

18. A motor vehicle, comprising a lighting device which includes a housing having first and second housing parts to define a receiving space, a light conductor arranged in the receiving space and emitting light, and an elongated plastic film which is transparent for the light emitted by the light conductor,
   wherein the first and second housing parts are both inwardly recessed toward the elongated film strip and converge into linear marginal regions, wherein the elongated film strip is arranged between edges of the housing parts and between the linear marginal regions of the housing parts and terminates flush with the linear marginal regions, wherein said elongated plastic film has two opposite ends spaced from one another in a direction of elongation and having ends faces extending transversely to the direction of elongation, and wherein the light conductor is arranged at a side of one of the transversely extending end faces of the film strip so that the light emitted by the light conductor is projected into the one transversely extending end face of the film strip and is extracted from another of the transversely extending ends faces of the film strip.

\* \* \* \* \*